United States Patent
Burckart et al.

(10) Patent No.: US 8,176,051 B2
(45) Date of Patent: May 8, 2012

(54) SEARCH VIA FAST CASE INSENSITIVE ASCII TREE

(75) Inventors: Erik John Burckart, Raleigh, NC (US); Madhu K. Chetuparambil, Raleigh, NC (US); Rohit Dilip Kelapure, Durham, NC (US); Jeffrey A. Lee, Morrisville, NC (US); Aravind Srinivasan, Raleigh, NC (US); Kevin Edward Vaughan, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 2206 days.

(21) Appl. No.: 10/857,782

(22) Filed: May 27, 2004

(65) Prior Publication Data

US 2005/0278283 A1    Dec. 15, 2005

(51) Int. Cl.
 *G06F 17/30* (2006.01)
(52) U.S. Cl. .................. 707/741; 707/797; 707/801
(58) Field of Classification Search .............. 707/1, 3, 707/787, 741, 801; 341/57, 79
See application file for complete search history.

(56) References Cited

U.S. PATENT DOCUMENTS

| | | | | |
|---|---|---|---|---|
| 5,034,989 A * | 7/1991 | Loh | | 382/189 |
| 5,228,133 A * | 7/1993 | Oppedahl | | 707/6 |
| 5,615,285 A * | 3/1997 | Beernink | | 382/189 |
| 5,778,371 A * | 7/1998 | Fujihara | | 707/100 |
| 5,815,096 A * | 9/1998 | Smith | | 341/51 |
| 5,936,965 A * | 8/1999 | Doshi et al. | | 370/469 |
| 6,047,283 A * | 4/2000 | Braun | | 707/3 |
| 6,671,856 B1 * | 12/2003 | Gillam | | 715/531 |
| 6,708,186 B1 * | 3/2004 | Claborn et al. | | 707/102 |
| 6,738,779 B1 * | 5/2004 | Shapira | | 707/101 |
| 6,952,694 B2 * | 10/2005 | Mathur et al. | | 707/6 |
| 6,983,295 B1 * | 1/2006 | Hart | | 707/204 |
| 2004/0225999 A1 * | 11/2004 | Nuss | | 717/114 |
| 2005/0102276 A1 * | 5/2005 | Dinh et al. | | 707/3 |
| 2005/0216445 A1 * | 9/2005 | Rao | | 707/3 |
| 2005/0278283 A1 * | 12/2005 | Burckart et al. | | 707/1 |
| 2006/0020595 A1 * | 1/2006 | Norton et al. | | 707/6 |

* cited by examiner

*Primary Examiner* — Mark A Radtke
*Assistant Examiner* — Kellye Buckingham
(74) *Attorney, Agent, or Firm* — Jeanine S. Ray-Yarletts

(57) ABSTRACT

A system and method for searching a bytestream or other string in a case insensitive manner. In a preferred embodiment, the present invention includes an ASCII tree that associated both upper and lower case letters of an incoming header key (or other symbols) with nodes. When enough nodes are gathered, a target word is found.

4 Claims, 4 Drawing Sheets

| Dec | Hx | Oct | Char |  | Dec | Hx | Oct | Html | Chr | Dec | Hx | Oct | Html | Chr | Dec | Hx | Oct | Html | Chr |
|---|---|---|---|---|---|---|---|---|---|---|---|---|---|---|---|---|---|---|---|
| 0 | 0 | 000 | NUL | (null) | 32 | 20 | 040 |   | Space | 64 | 40 | 100 | @ | @ | 96 | 60 | 140 | ` | ` |
| 1 | 1 | 001 | SOH | (start of heading) | 33 | 21 | 041 | ! | ! | 65 | 41 | 101 | A | A | 97 | 61 | 141 | a | a |
| 2 | 2 | 002 | STX | (start of text) | 34 | 22 | 042 | " | " | 66 | 42 | 102 | B | B | 98 | 62 | 142 | b | b |
| 3 | 3 | 003 | ETX | (end of text) | 35 | 23 | 043 | # | # | 67 | 43 | 103 | C | C | 99 | 63 | 143 | c | c |
| 4 | 4 | 004 | EOT | (end of transmission) | 36 | 24 | 044 | $ | $ | 68 | 44 | 104 | D | D | 100 | 64 | 144 | d | d |
| 5 | 5 | 005 | ENQ | (enquiry) | 37 | 25 | 045 | % | % | 69 | 45 | 105 | E | E | 101 | 65 | 145 | e | e |
| 6 | 6 | 006 | ACK | (acknowledge) | 38 | 26 | 046 | & | & | 70 | 46 | 106 | F | F | 102 | 66 | 146 | f | f |
| 7 | 7 | 007 | BEL | (bell) | 39 | 27 | 047 | ' | ' | 71 | 47 | 107 | G | G | 103 | 67 | 147 | g | g |
| 8 | 8 | 010 | BS | (backspace) | 40 | 28 | 050 | ( | ( | 72 | 48 | 110 | H | H | 104 | 68 | 150 | h | h |
| 9 | 9 | 011 | TAB | (horizontal tab) | 41 | 29 | 051 | ) | ) | 73 | 49 | 111 | I | I | 105 | 69 | 151 | i | i |
| 10 | A | 012 | LF | (NL line feed, new line) | 42 | 2A | 052 | * | * | 74 | 4A | 112 | J | J | 106 | 6A | 152 | j | j |
| 11 | B | 013 | VT | (vertical tab) | 43 | 2B | 053 | + | + | 75 | 4B | 113 | K | K | 107 | 6B | 153 | k | k |
| 12 | C | 014 | FF | (NP form feed, new page) | 44 | 2C | 054 | , | , | 76 | 4C | 114 | L | L | 108 | 6C | 154 | l | l |
| 13 | D | 015 | CR | (carriage return) | 45 | 2D | 055 | - | - | 77 | 4D | 115 | M | M | 109 | 6D | 155 | m | m |
| 14 | E | 016 | SO | (shift out) | 46 | 2E | 056 | . | . | 78 | 4E | 116 | N | N | 110 | 6E | 156 | n | n |
| 15 | F | 017 | SI | (shift in) | 47 | 2F | 057 | / | / | 79 | 4F | 117 | O | O | 111 | 6F | 157 | o | o |
| 16 | 10 | 020 | DLE | (data link escape) | 48 | 30 | 060 | 0 | 0 | 80 | 50 | 120 | P | P | 112 | 70 | 160 | p | p |
| 17 | 11 | 021 | DC1 | (device control 1) | 49 | 31 | 061 | 1 | 1 | 81 | 51 | 121 | Q | Q | 113 | 71 | 161 | q | q |
| 18 | 12 | 022 | DC2 | (device control 2) | 50 | 32 | 062 | 2 | 2 | 82 | 52 | 122 | R | R | 114 | 72 | 162 | r | r |
| 19 | 13 | 023 | DC3 | (device control 3) | 51 | 33 | 063 | 3 | 3 | 83 | 53 | 123 | S | S | 115 | 73 | 163 | s | s |
| 20 | 14 | 024 | DC4 | (device control 4) | 52 | 34 | 064 | 4 | 4 | 84 | 54 | 124 | T | T | 116 | 74 | 164 | t | t |
| 21 | 15 | 025 | NAK | (negative acknowledge) | 53 | 35 | 065 | 5 | 5 | 85 | 55 | 125 | U | U | 117 | 75 | 165 | u | u |
| 22 | 16 | 026 | SYN | (synchronous idle) | 54 | 36 | 066 | 6 | 6 | 86 | 56 | 126 | V | V | 118 | 76 | 166 | v | v |
| 23 | 17 | 027 | ETB | (end of trans. block) | 55 | 37 | 067 | 7 | 7 | 87 | 57 | 127 | W | W | 119 | 77 | 167 | w | w |
| 24 | 18 | 030 | CAN | (cancel) | 56 | 38 | 070 | 8 | 8 | 88 | 58 | 130 | X | X | 120 | 78 | 170 | x | x |
| 25 | 19 | 031 | EM | (end of medium) | 57 | 39 | 071 | 9 | 9 | 89 | 59 | 131 | Y | Y | 121 | 79 | 171 | y | y |
| 26 | 1A | 032 | SUB | (substitute) | 58 | 3A | 072 | : | : | 90 | 5A | 132 | Z | Z | 122 | 7A | 172 | z | z |
| 27 | 1B | 033 | ESC | (escape) | 59 | 3B | 073 | ; | ; | 91 | 5B | 133 | [ | [ | 123 | 7B | 173 | { | { |
| 28 | 1C | 034 | FS | (file separator) | 60 | 3C | 074 | < | < | 92 | 5C | 134 | \ | \ | 124 | 7C | 174 | | | \| |
| 29 | 1D | 035 | GS | (group separator) | 61 | 3D | 075 | = | = | 93 | 5D | 135 | ] | ] | 125 | 7D | 175 | } | } |
| 30 | 1E | 036 | RS | (record separator) | 62 | 3E | 076 | > | > | 94 | 5E | 136 | ^ | ^ | 126 | 7E | 176 | ~ | ~ |
| 31 | 1F | 037 | US | (unit separator) | 63 | 3F | 077 | ? | ? | 95 | 5F | 137 | _ | _ | 127 | 7F | 177 |  | DEL |

*FIG. 3*

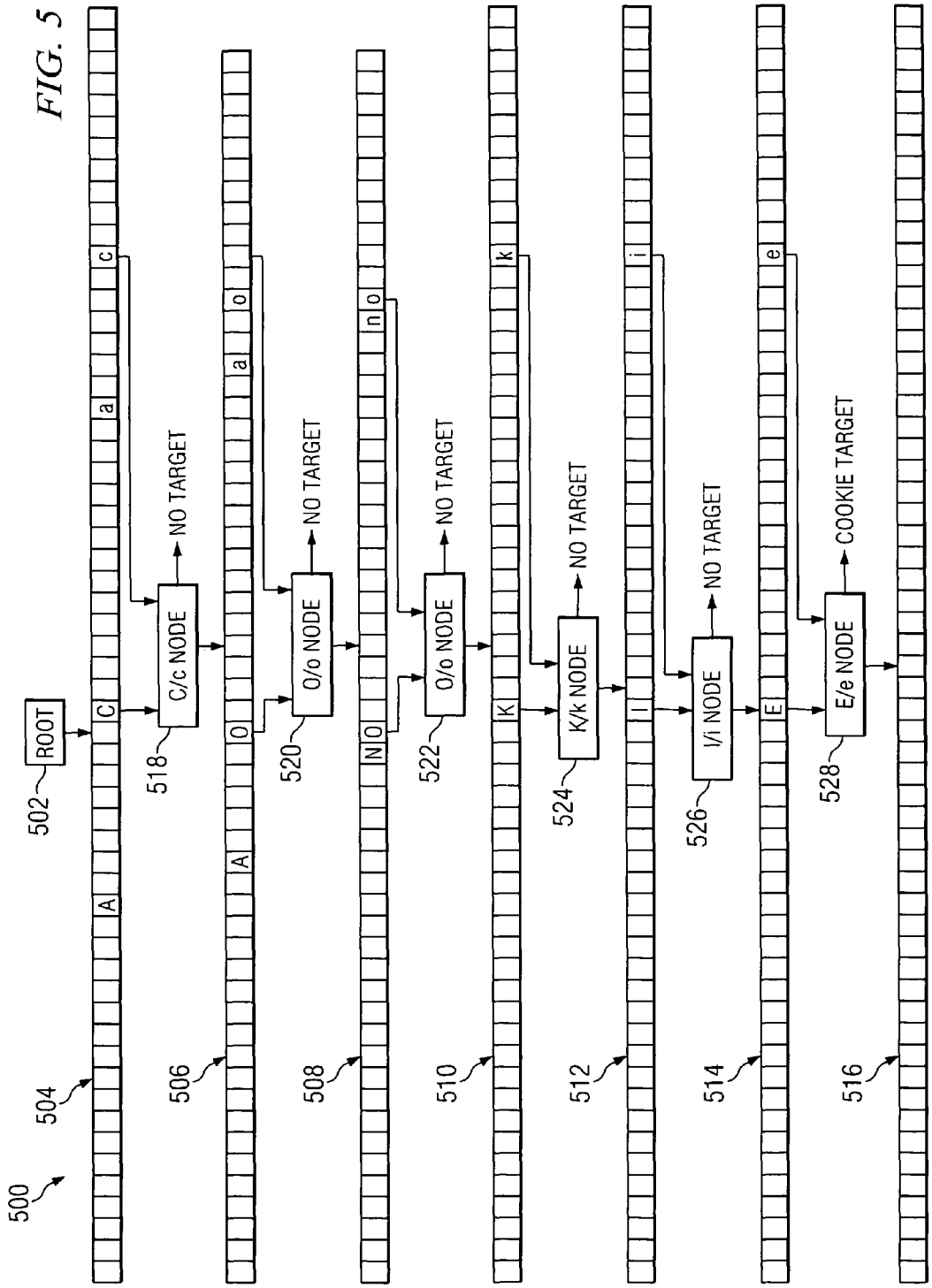

SEARCH VIA FAST CASE INSENSITIVE ASCII TREE

BACKGROUND OF THE INVENTION

1. Technical Field

The present invention relates generally to case insensitive searches, and more particularly to searching a byte stream in a case insensitive manner without requiring normalization of the byte stream.

2. Description of Related Art

Hypertext Transfer Protocol (HTTP) is an application-level protocol for distributed, collaborative, hypermedia information systems. It is a generic, stateless protocol which can be used for many tasks beyond its use for hypertext, such as name servers and distributed object management systems, through extension of its request methods, error codes and headers.

HTTP/1.1 has defined syntax and semantics for all header fields. While implementing HTTP/1.1 spec, it is often necessary to search, (e.g., for "header keys") while parsing a byte stream. Such searches must be performed in a case insensitive manner, so that no matter the case of the text of the header keys, the header keys may still be identified. In the current state of the art, characters of the byte stream must be normalized before searching them. For example, in many prior art systems, the byte stream is normalized by identifying all characters and transforming them into the same case, such as into lower case. After the characters have all been thus modified, the byte stream can then be searched for relevant targets. Without normalization, changes of case, whether planned or accidental, can foil search attempts.

The process of normalization requires an added computing step beyond the actual searching, and is computationally expensive. Therefore, it would benefit the art to have a way to search a byte stream without the need to first normalize the byte stream.

SUMMARY OF THE INVENTION

The present invention describes a system and method for searching a bytestream or other string of symbols in a case insensitive manner. In one example embodiment, the present invention comprises a root having a set of characters, a plurality of nodes, wherein each node is associated with an upper and lower case version of a character, a plurality of arrays, wherein each array includes upper and lower case versions of characters. As a bytestream is searched, upper and lower case letters are recognized and associated with an associated node. In this way, normalization is not required in order to search the bytestream for header keys. Further embodiments of the present invention are described more fully below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 shows an ASCII table as is implemented in preferred embodiments of the present invention.

FIG. 5 shows an example storage for a particular header key in a search tree consistent with a preferred embodiment of the present invention.

DETAILED DESCRIPTION OF THE PREFERRED EMBODIMENT

Figure 1:
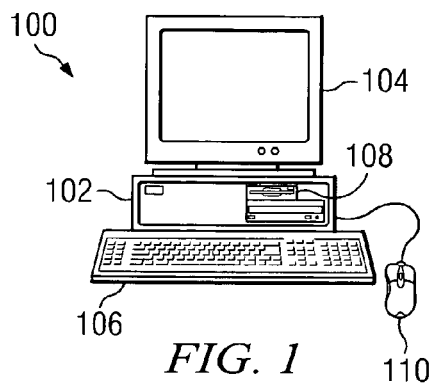
FIG. 1 shows an image of a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
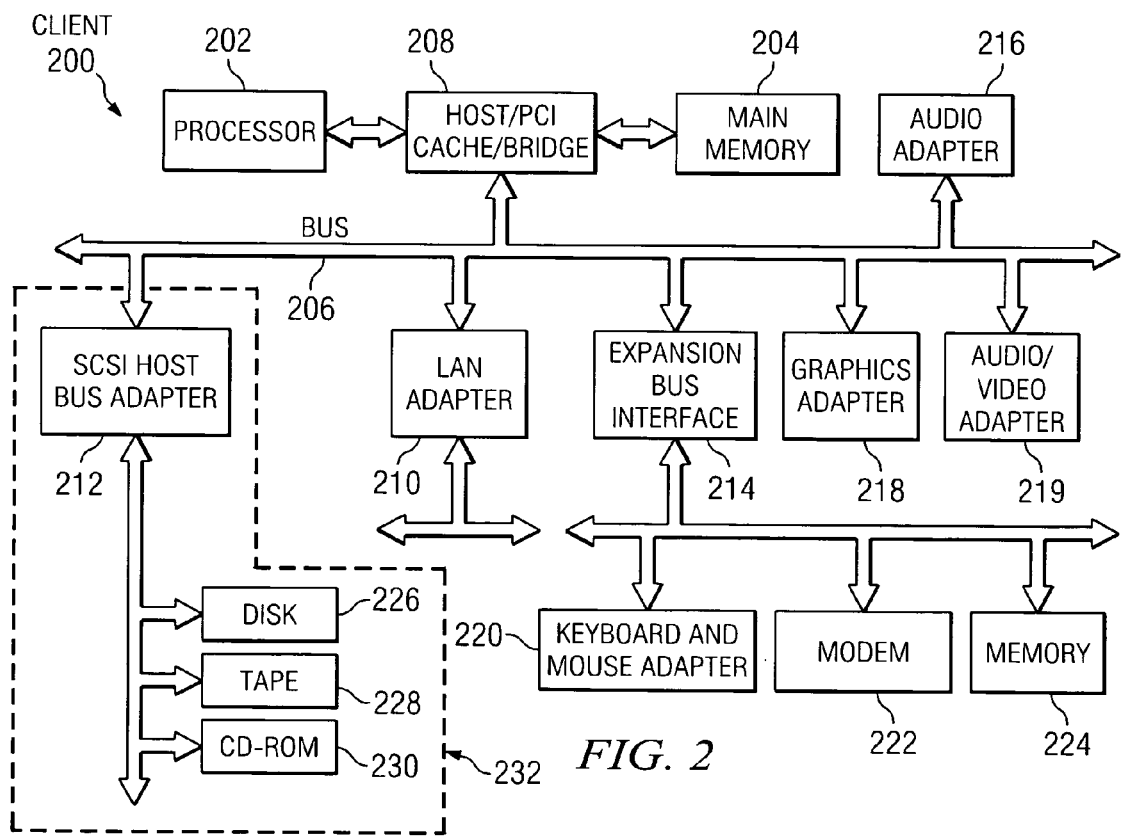
FIG. 2 shows a diagram of elements of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention describes a system and method for searching a bytestream (or more broadly, any text strings) in a case insensitive manner without the need to first go through a normalization process. In a preferred embodiment, the present invention uses an ASCII tree wherein every node has an array of possible other nodes representing a subset of the allowable ASCII characters at that node. Every ASCII letter has a reference to the same node in both its upper case and lower case forms, so that no matter the case of a character it can be recognized and will reference the same node. Thus, every character may enter the tree with unknown case (i.e., not normalized) yet be recognized.

Though the ASCII tree is used in the preferred embodiment, the invention is not limited to that particular standard for character representation. The ASCII tree is chosen for preferred embodiments because of the familiar association of the necessary symbols and characters in both cases to integers, which are more easily manipulated. FIG. 3 shows the ASCII table.

Multiple ASCII tables are assembled into an ASCII tree that has special nodes throughout. Each node comprises a target and 128 node pointers (or references in Java). The node data structure is depicted in FIG. 4.

Figure 4:
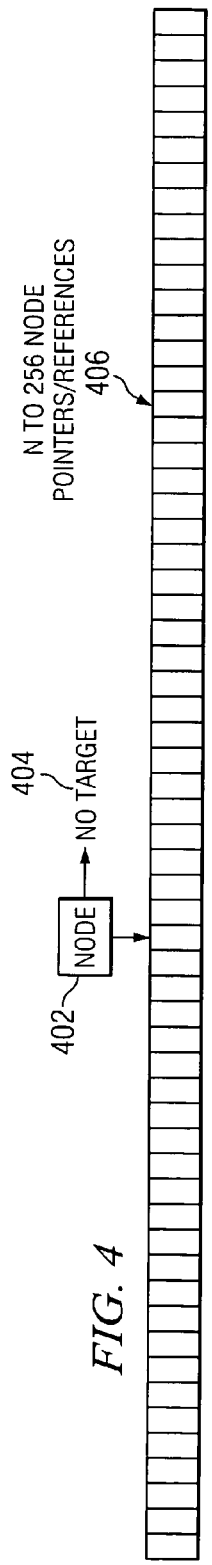
FIG. 4 shows an example node and associated pointers consistent with implementing a preferred embodiment of the present invention.

FIG. 4 shows a node 402 and an associated target 404. The target refers to the object the lookup process is working toward. For example, if the header key "cookie" entered the search tree, the end node of that search process (i.e., the node reached after parsing the "e" in "cookie") points to the target, "cookie".

Pointers 406 refers to the array of allowable characters of symbols for that branch of that level of the search tree. In a preferred embodiment, there are 128 possible pointers in any given branch of a level of the search tree.

The tree is constructed using multiple ASCII tables at different levels. In the first level there is only one table, called the root. This table includes pointers to all possible first characters (including symbols in some embodiments) of words or strings that can be found using the tree. For example, if the tree is designed to find words "Cache-control," "Cookie," and "Connection," then the root would include only the letter C, in both upper and lower case. If, however, the tree were designed to find the words "Cache-control," "Cookie," "Accept," and "Connection," then the root would include C, c, A, and a. Thus, in searching the incoming bytestream, the root would recognize the first letter of the four terms which the tree is designed to find.

Though the invention is explained in the context of finding header keys, it is not limited to that application. However, the application will refer to header keys when discussing target words. Further, though the application refers to searching a bytestream in the examples that follow, but it should be understood that the innovations herein described are applicable to any text string.

The search tree of the present invention is designed with all possible searched-for words (i.e., target words) built in. In preferred embodiments, the tree includes all possible header keys for HTTP/1.1. A new search word can be added to existing search trees by adding the letters of the new word into the appropriate levels of the tree.

The root, as mentioned above, is an array with all possible first letters of all possible target words, in both upper and lower case. Each letter is a pointer that points to a node. For example, in the above example with "Accept," "Cache-control," "Cookie," and "Connection," the root array contains A, a, C and c. If the incoming letter matches either C or c, then the node "C/c" is reached. If the incoming letter matches either A or a, then the A/a node is reached. The node of this description corresponds to node 402 of FIG. 4.

Once the first node is discovered, the next letter of the header key in the incoming bytestream is input to the search tree, but at the second level of the tree. The second level of the tree includes all possible second letters of target words, in both cases (upper and lower). When the second letter of the actual incoming word is input to the table, it goes to a branch of the tree that corresponds only to second letters that follow the already-discovered first letter. Hence, referring again to the four above example header keys, if the input header key were "Cookie," then the C/c node was reached first and the next letter, "o" is input at a branch of the second level, the branch containing A, a, 0, and o. Only these letters need be present in this branch of the second level, because this branch is reached only after having discovered the first letter as corresponding to the C/c node.

If, however, the incoming header key were "Accept," then the A/a node would have first been reached, and the branch of the second level for the next letter ("c", the second letter of "Accept") would only include C and c. This is because in our example search tree, we only included the four above mentioned header keys, and only one begins with A or a.

In preferred embodiments, all known header keys are included in the search tree, so that the root includes all first letters of all potential header keys.

FIG. 5 shows an example storage for the "Cookie" header where "Cookie," "Accept," "Connection," and "Cache-Control" header keys are the only header keys included in a simplified search tree.

Tree 500 includes root 502 and arrays 504-516. Array 504 includes the first letters of all words which the search tree is designed to detect in a bytestream. In this example, "A" and "a", and "C" and "c" are included in array 504 because the only first letters of incorporated words are "A" and "C". When the first letter is identified in array 504, node 518 is identified as the associated node. Node 518 represents the letter "C" in a case insensitive way, as it is identified with both upper and lower case versions from array 504. Note that the tree includes an opportunity to complete the search, but "no target" is indicated in this example because the input word has more characters. In preferred embodiments, the tree will not select a target until all characters of an input tree have been input. Each node has a target, in case the user has completed the search at a specific node and that node is not necessarily the end of the possible search. For example, if both "Accept" and "Accept-Encoding" were incorporated into a search tree, parsing to the end of "Accept" would not produce a target if more symbols or characters follow. If, however, there were no more symbols after the "t" in "Accept", then the search would end and a target selected. In preferred embodiments incorporating HTTP/1.1, a colon ":" indicates the end of a header key and invokes selection of a target. Other means of deciding when to choose a target can also be implemented.

The next letter of the incoming word "Cookie" (from the bytestream) is input to the tree. Since the first letter was "C", the second array 506 is filled only with upper and lower case letters of those words having a first letter of upper or lower case "C". Therefore, array 506 includes "A", "a", "O", and "o". Note that "a" is the second letter of "Cache-Control," while "o" is the second letter of both "Cookie" and "Connection." The second letter of "Accept," is not present in array 506 because "c" does not follow the already-discovered first letter, "C" in any of the header keys incorporated into this example search tree. Hence, as the search tree progresses and discovers new letters, certain paths through the tree are eliminated as not having been selected. Had the header key "Accept" been input into the tree instead of "Cookie," then the "A" would have been detected, and a different array of the tree (not shown) would have been reached instead of array 506.

This process continues, with the "o" in cookie being associated with node 520. Now the process passes to the next array 508 which only includes characters appearing in a header key following a "C" and then an "O" of either upper or lower case. Array 508 therefore includes upper and lower case versions of "N" and "O" because both "Cookie" and "Connection" fulfill these requirements. Since the input word was "Cookie," array 508 points to node 522, the O/o node.

At this point, in this simplified example, the only possible letter for the next array 510 is K, and this letter is present in both cases. The process continues through nodes 524-528, and arrays 510-516. Once the end of the header key is reached (indicated in HTTP/1.1 with a colon symbol), the "Cookie" target is reached, and the input header key is discovered. Note that because the arrays each include upper and lower case versions of the letters, the entire search is case insensitive and requires no normalization at all. Instead of first normalizing the bytestream or part thereof and then searching it for the header key, the innovative search tree of the present invention allows searching to be performed without a normalization step. This reduces computational expense of parsing and searching a bytestream. Instead of incurring the expense of normalization at runtime, the overhead expense of making the search case insensitive is incurred up front, with the creation of the search tree itself.

Figure 6:
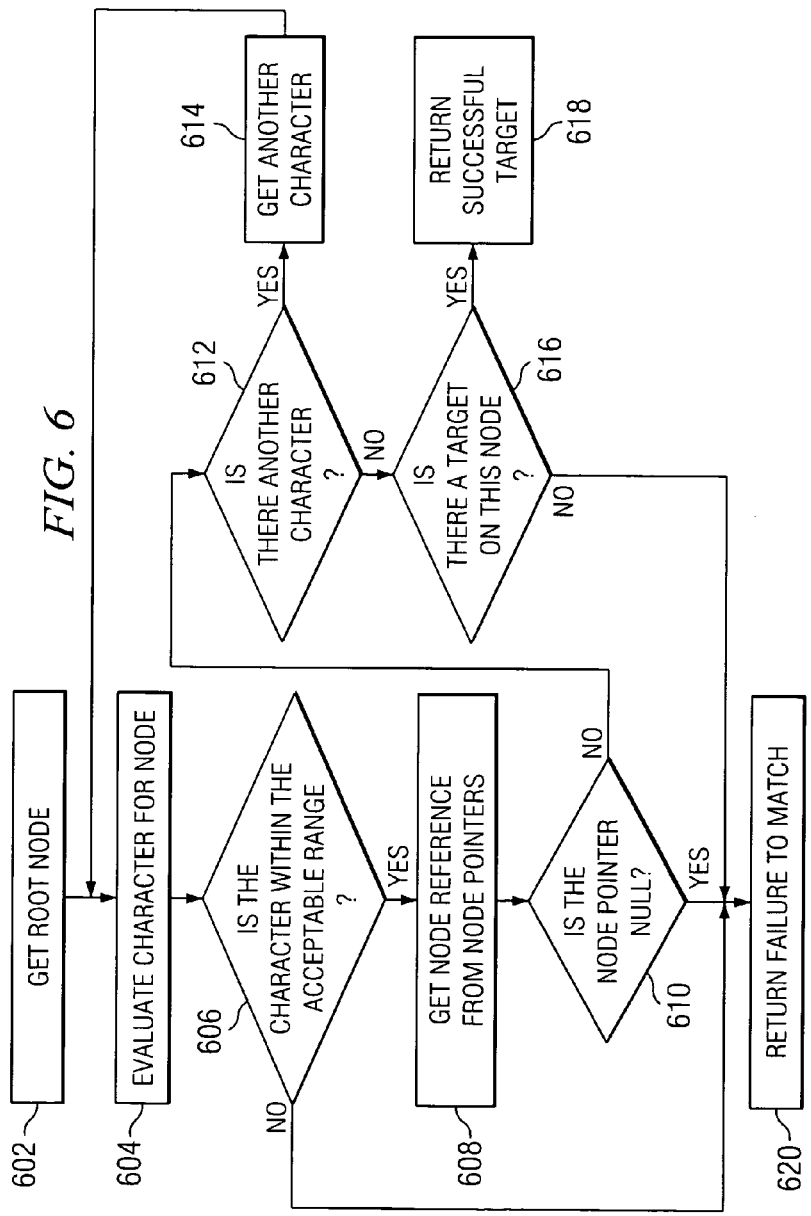
FIG. 6 shows process steps consistent with implementing a preferred embodiment of the present invention.

FIG. 6 shows a flow chart with process steps for implementing a preferred embodiment of the present invention. When parsing using the present invention, the code begins by obtaining a reference to the root node. A reference, also called a pointer, is a memory address that points to the object or structure in the operating system's managed memory. Inside each node is an array of references of other nodes.

First the process begins with the root node (step 602). The root node points to an array that includes all potential first letters of all header keys incorporated into the search tree. The root node's array is evaluated to see if the first letter of an incoming header key is present (step 604). If the character is one of the characters present in the array ("yes"), the process proceeds to step 608. If not, then the character is not present in the array and the search tree is not designed to detect the input word or header key. In this case, a "no" is returned and a "Failure to Match" is returned (step 620).

If the character is within the acceptable range, i.e., it is recognized in the array, the node reference is obtained from the node pointers (step 608). The pointer is checked to see if it is a null pointer (step 610). If so, another failure to match is returned (step 620). If not, then the process checks for another character (step 612). If there is another character in the input header key, then that character is retrieved (step 614) and the process returns to step 604. If there is no other character, then the process checks to see if the characters found match a target (step 616). If not, a Failure to Match is returned (step 620). If so, a successful target is returned (step 618).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer implemented method for searching for a bytestream in a search tree, the computer implemented method comprising:

providing a search tree comprising a plurality of nodes, wherein each corresponding node of the plurality of nodes comprises a corresponding target and a corresponding first node array, wherein corresponding first node arrays each comprise a corresponding plurality of first characters and a corresponding first node pointer, and wherein corresponding first node pointers each contain a corresponding first node reference and a corresponding second node array, wherein corresponding second node arrays each comprise a corresponding plurality of second characters and a corresponding second node pointer, and wherein corresponding second node pointers contain a corresponding second node reference;

receiving a bytestream, wherein the bytestream contains a plurality of symbols, wherein the plurality of symbols contains a first symbol, a second symbol, and an end symbol;

selecting the first symbol;

determining whether the first symbol matches one of the ones of the corresponding plurality of first characters in the corresponding first node arrays;

responsive to determining that the first symbol matches the one of the ones of first characters, retrieving a first node reference of the corresponding first node reference;

thereafter selecting the second symbol;

determining whether the second symbol matches the one of the ones of the corresponding plurality of second characters in the corresponding second node arrays;

responsive to determining that the second symbol matches one of the ones of second characters, retrieving a second node reference of the corresponding second node reference;

thereafter continuing to retrieve each one of the plurality of symbols until the end symbol is retrieved;

responsive to retrieving the end symbol, retrieving the target.

2. The method of claim 1, wherein each character of the corresponding first characters and each character of the corresponding second characters comprises one of a character type in the group consisting of:

an uppercase representation of the character;

a lower case representation of the character, and an ASCII symbol.

3. The method of claim 1, wherein the bytestream is in an un-normalized format.

4. The method of claim 1, wherein the bytestream comprises text representing header keys for hypertext transfer protocol.

* * * * *